United States Patent [19]

Scheurecker et al.

[11] 4,286,678
[45] Sep. 1, 1981

[54] CARRYING TOWER FOR A METALLURGICAL VESSEL

[75] Inventors: Werner Scheurecker, Linz; Ernst Drab, Kirchdorf an der Krems, both of Austria

[73] Assignee: Voest-Alpine Aktiengesellschaft, Linz, Austria

[21] Appl. No.: 73,865

[22] Filed: Sep. 10, 1979

[30] Foreign Application Priority Data

Oct. 4, 1978 [AT] Austria ................................. 7143/78

[51] Int. Cl.³ ...................... G01G 19/52; B22D 39/04
[52] U.S. Cl. ..................................... 177/132; 222/607
[58] Field of Search .................. 177/139, 211, 132; 222/607

[56] References Cited

U.S. PATENT DOCUMENTS

| | | | |
|---|---|---|---|
| 2,643,781 | 6/1953 | Wise | 177/139 X |
| 3,344,847 | 10/1967 | Beemer | 222/607 X |

FOREIGN PATENT DOCUMENTS 2234946  1/1975  France.

Primary Examiner—George H. Miller, Jr.
Attorney, Agent, or Firm—Brumbaugh, Graves, Donohue & Raymond

[57] ABSTRACT

A carrying tower for a metallurgical vessel includes at least one carrying arm for accommodating the vessel. The carrying arm projects from a carrying column and has a weighing device. Also the arm is dividedly designed and the carrying arm parts thus formed are articulately connected with each other about a horizontal axis. For exactly measuring the weight of the metallurgical vessel held by the carrying arm, the carrying arm parts each have a supporting face for support with respect to each other, which supporting faces are arranged at a distance from the axis connecting the carrying arm parts, and a force measuring device inserted between these supporting faces.

10 Claims, 9 Drawing Figures

CARRYING TOWER FOR A METALLURGICAL VESSEL

BACKGROUND OF THE INVENTION

The invention relates to a carrying tower for metallurgical vessels, in particular for a continuous casting plant. The tower includes at least one carrying arm for accommodating the metallurgical vessel, in particular a casting ladle or a tundish, which arm projects from a carrying column and includes a weighing device. The carrying arm is designed to be divided and the carrying arm parts thus formed are connected with each other articulately about a horizontal axis.

In metallurgical plants there is always a need to know exactly and to control the amount of the contents of metallurgical vessels. In particular, when continuously casting it is advantageous, for safeguarding the continuity of casting, to continuously weigh the casting ladle and the distributing vessel (tundish) so that the amount of the contents in these metallurgical vessels is always known, a ladle exchange thus being feasible before the ladle is empty.

It is known, for the purpose of weighing, to equip carrying arrangements for metallurgical vessels with pressure measuring devices. Thus, it is known for instance from U.S. Pat. No. 3,587,760 to place the vessel to be weighed onto a frame which is supported against a movable base via pressure measuring devices.

For accommodating the horizontal forces falsifying the measured result, vertical guides are provided in the known constructions. With these guides, which can also be designed as guide rods, falsifications of the measuring results still occur, however, due to frictional forces.

From French Pat. No. 2,234,946 a ladle carrying tower of the initially-described kind is known, comprising two carrying arms which are each assembled of several lugs forming a linkage parallelogram. Each of the carrying arms is pivotable about the links of the lugs provided at the carrying tower by means of a pressure medium cylinder, whereby the casting ladle can be lifted and lowered. In one of the links of the four-bar linkage, a weighing device is installed. With this construction there is also the disadvantage that the measuring result is falsified during weighing by horizontal forces acting upon the link and by frictional forces occurring within the link.

SUMMARY OF THE INVENTION

The invention aims at avoiding these disadvantages and difficulties and has as its object to provide a carrying tower which enables a faultless measurement of the weight of the metallurgical vessel carried by it, falsifications of the measuring values, in particular falsifications of the measuring values caused by frictional forces, being avoided.

These objects are achieved according to the invention in that the carrying arm parts each comprise a supporting face for support on each other,
the supporting faces are arranged at a distance from the axis connecting the carrying arm parts, and
a force measuring device, such as a load cell, is inserted between these supporting faces.

For the purpose of relieving the measuring device from impacts, which for instance occur when placing a ladle onto the carrying tower, a pressure medium cylinder is advantageously inserted between the supporting faces of the carrying arm parts. By this measure, a simple installation and removal of the force measuring device is also feasible.

A preferred embodiment of the carrying tower has a carrying arm comprised, at its projecting end, of two arms laterally supporting the metallurgical vessel. The metallurgical vessel rests on the end parts of the arm. This arrangement is characterized in that the end parts of each arm are articulately connected with the pertaining arm by means of a bolt arranged on the upper side of the arm and horizontally lying in the vertical division plane.

It is advantageous, if each arm comprises two end parts that have different longitudinal extensions and both end parts of each arm are articulately connected with the pertaining arm by means of a common bolt. The metallurgical vessel is thus supported at both end parts of each arm. Furthermore each end part is preferably provided with a supporting face contacting a force measuring device of its own. As a result falsifications of the measured values caused by changes in the distance of the center of gravity of the metallurgical vessel from the axes of the bolts—for instance on account of a one-sided, unsymmetrical lining of the metallurgical vessel or on account of skull formations—can be balanced out. According to a preferred embodiment, the carrying arm is divided transversely to its longitudinal direction.

BRIEF DESCRIPTION OF THE DRAWINGS

The invention will now be described in more detail by way of six embodiments and with reference to the accompanying drawings, wherein.

DESCRIPTION OF ILLUSTRATIVE EMBODIMENTS

Figure 1:
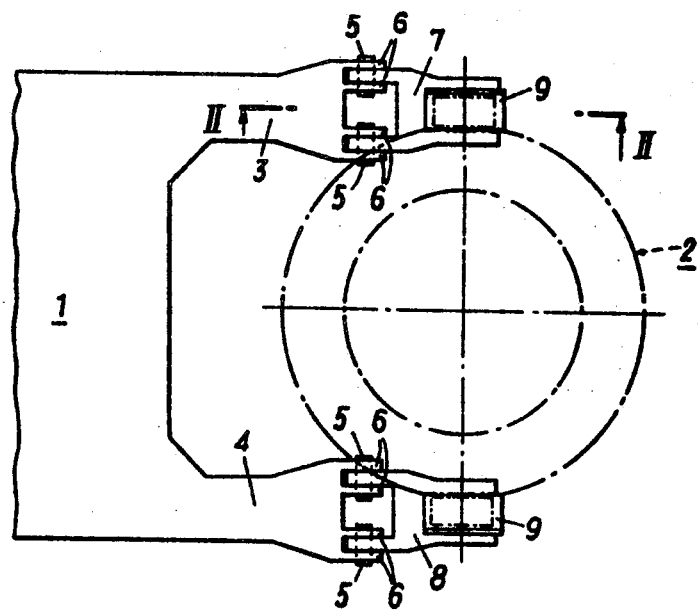
FIG. 1 is a top view of a carrying arm of a carrying tower.
Figure 2:
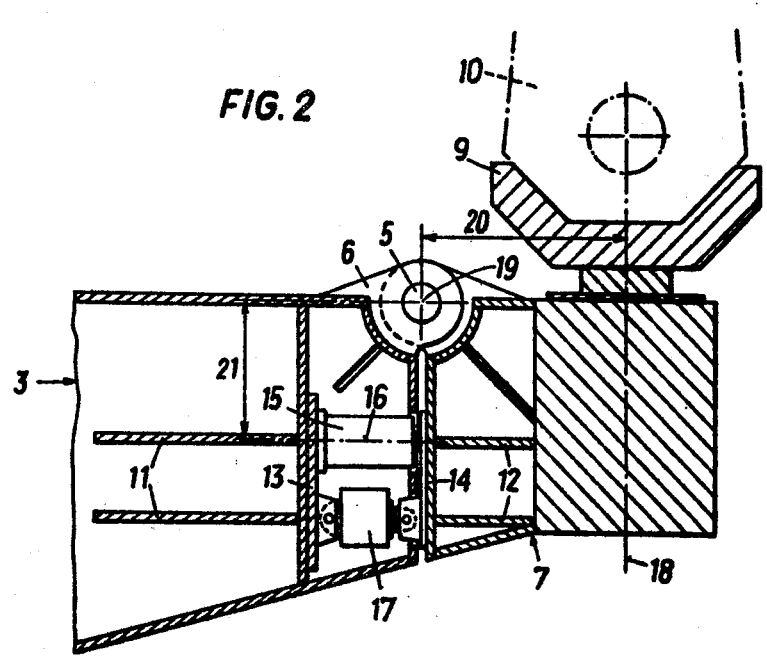
FIG. 2 shows a section according to line II—II of FIG. 1.

A carrying arm 1 of a ladle-carrying rotary tower accommodates at its end a ladle 2. The arm actually comprises two arms 3, 4 laterally embracing the ladle. The carrying arm may be rotatable, and liftable and lowerable about a carrying column (not illustrated) of the ladle-carrying rotary tower. On the upper side of the arms 3, 4 horizontally arranged bolts 5, which are in alignment with each other, are each fastened in lugs 6, on which bolts end parts 7, 8 of the arms are pivotably mounted. The end parts are provided with load-accommodating means 9 in which the carrying lugs 10 of the ladle 2 are supported. The respective ends of the arms 3, 4 and of the end parts 7, 8 which face each other comprise supporting faces 13 and 14, respectively, that are reinforced by ribs 11, 12. The supporting faces extend approximately vertically and are also directed toward each other. Between these supporting faces 13, 14 force-measuring devices, such as pressure-measuring cells 15, are inserted. Each pressure-measuring cell 15 is fastened to the supporting faces 13 of the arms 3, 4, and the opposite supporting faces 14 of the end parts 7 and 8, respectively, loosely contact the load cells 15. The axes 16 of the load cells, i.e. their lines of influence, extend substantially at right angles to the supporting faces 13, 14, which are approximately parallel to each other.

In the arms 3, 4 a pressure medium cylinder 17 is installed below the load cells 15, which cylinder is articulately connected both with the supporting face 13 of the arms 3, 4 and with the supporting face 14 of the end parts 7, 8. If the pressure medium cylinder is actuated, the supporting face 14 of each end part 7, 8 is lifted off the load cells 15 by pivoting of the end parts 7, 8 about the bolts 5.

The distance of the action line 18, through which the weight force of the ladle acts upon the end parts 7, 8, to the axis 19 of the bolts is denoted by 20, and the distance of the axis 19 of the bolts 5 to the action line 16 of the force measuring device 15 is denoted by 21. Using to the lever law, the weight of the ladle 2, inclusive of its contents, can thus be calculated for each force indication by the force measuring devices 15.

Figure 3:
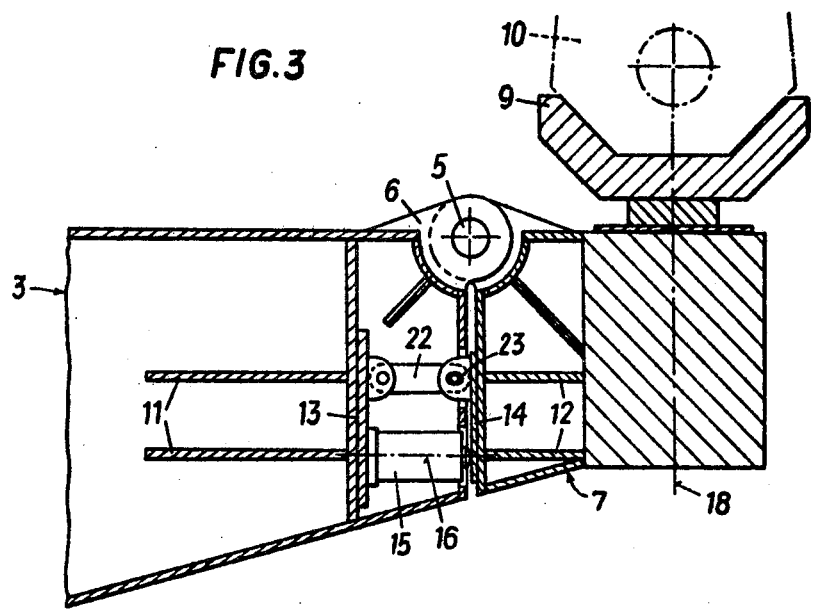
FIG. 3 illustrates a modified embodiment of the carrying arm, in a sectioned view similar to FIG. 2.

In the embodiment according to FIG. 3, no pressure medium cylinder 17 has been installed—which is easily possible if the force measuring device 15 is dimensioned sufficiently large—, however, the supporting faces 13, 14 of the arms 3, 4 and the end parts 7, 8, which face each other, are connected with each other by a lug 22. At one end the lug 22 is provided with a longitudinal slot 23 in order to ensure a sufficient movability of the end parts 7, 8 relative to the arms 3, 4.

Figure 4:
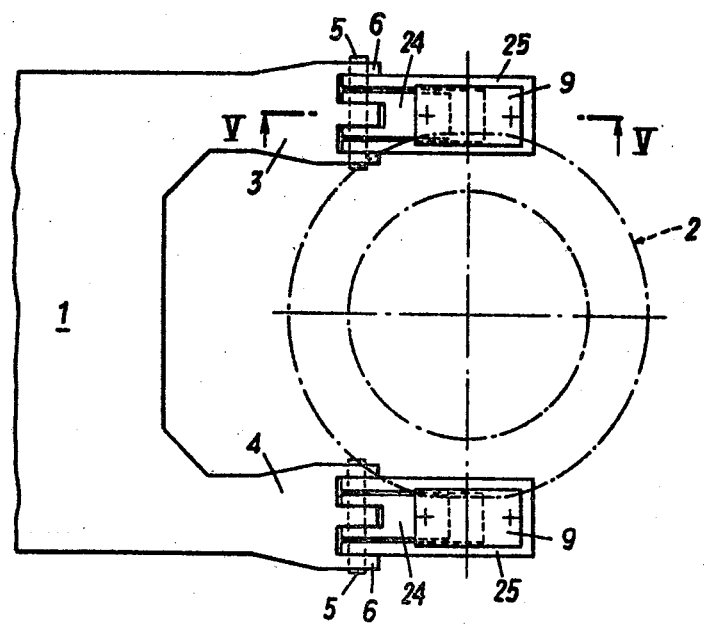
FIGS. 4 and 5 as well as FIGS. 6 and 7 are further embodiments in illustrations analogous to FIGS. 1 and 2.
Figure 5:
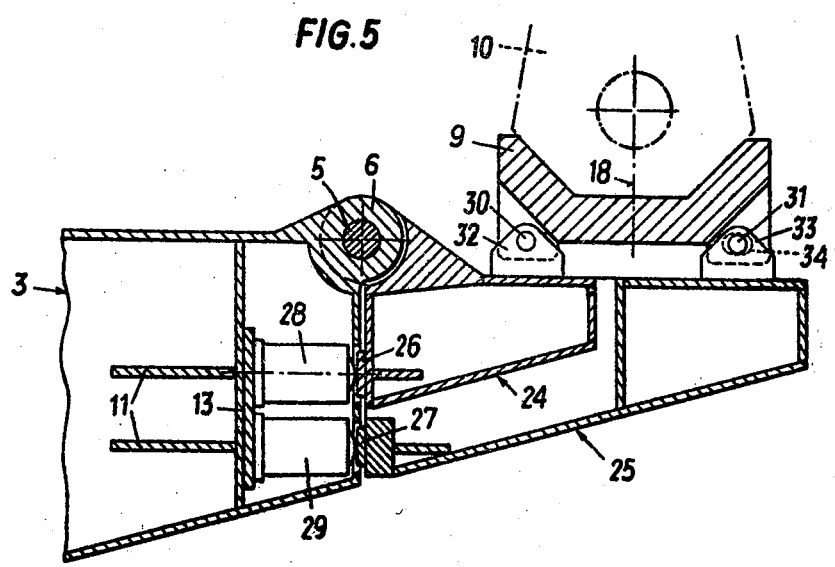

The embodiment according to FIGS. 4 and 5 shows, on each of the arms 3, 4, two end parts 24, 25 commonly hinged to bolts 5. The end part 25 projects beyond the second end part 24 in terms of length. Each of the end parts comprises a supporting face 26, 27, which lies opposite a supporting face 13 of the arms 3, 4, and is supported against this supporting face 13 of the arms 3, 4 by means of a separate force measuring device 28, 29. The ladle-accommodating means is supported at each of the two end parts 24, 25 via one bolt 30, 31 each, which are mounted in lugs 32, 33 of the end parts 24, 25. One of the bolts is inserted in a longitudinal slot 34 of the lug 33 for the purpose of balancing out changes of length. In this embodiment, no attention needs to be paid to an exact observance of the distance of the action line 18, in which the center of gravity of the ladle lies, to the bolt axis. A change of position of the action line may, for instance, be caused by a strong one-sided wear of the lining of the metallurgical vessel, or by the fact that the metallurgical vessel shows skull formations on one side. In such a case, the load portion of one of the bolts 30, 31 becomes greater and the load portion of the second bolt becomes smaller. Since the determination of weight is effected by summarizing the individual values measured by the load cells 28 and 29, the increase in and the reduction of the load portions acting on the end parts 24 and 25, respectively, of the metallurgical vessel, will be automatically balanced out.

Figure 6:
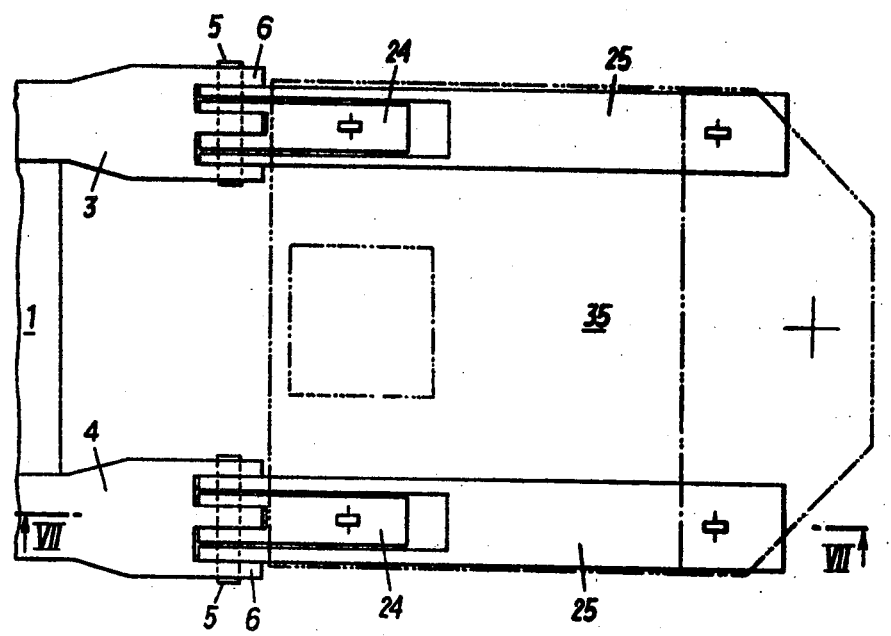
Figure 7:
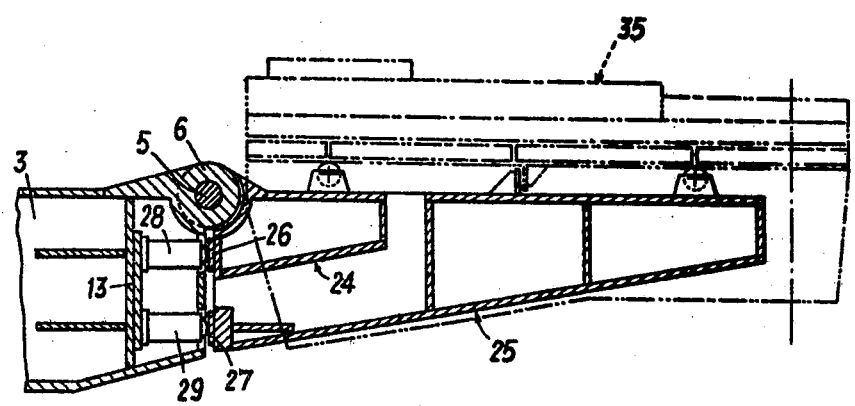

The carrying arm illustrated in FIGS. 6 and 7 serves for accommodating a tundish 35. It is designed in the same manner as the carrying arm illustrated in FIGS. 4 and 5, with equivalent operating parts being denoted by the same reference numerals.

Figure 8:
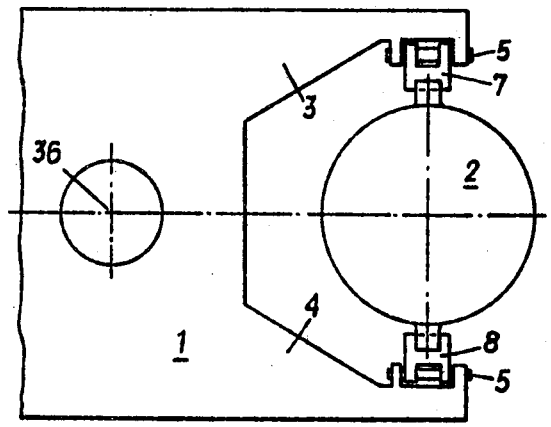
FIGS. 8 and 9 illustrate two further embodiments in an illustration analogous to FIG. 1.
Figure 9:
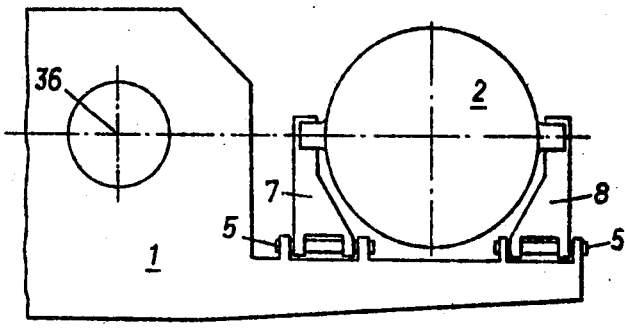

In the embodiments illustrated in FIGS. 8 and 9, the end parts 7 and 8 of the carrying arms 1 are each pivotably mounted on the carrying arm 1 by means of horizontally arranged bolts 5 directed in the longitudinal direction of the carrying arm 1, so that the carrying arm 1 is designed to be divided by a plane that is directed parallel to its longitudinal direction and parallel to the axis 36 of the rotary tower.

What we claim is:

1. In a carrying tower for a metallurgical vessel for use in a continuous casting plant, including a carrying column, at least one carrying arm projecting from said carrying column for accommodating said metallurgical vessel, weighing means being provided in said at least one carrying arm and said at least one carrying arm being dividedly designed so as to form carrying arm parts, said carrying arm parts being articulately connected with each other about a horizontal axis, the improvement which is characterized in that said carrying arm parts have supporting faces for support with respect to each other,
said supporting faces are arranged at a distance from the axis connecting said carrying arm parts, and
force measuring means are inserted between said supporting faces.

2. A carrying tower as set forth in claim 1, wherein said metallurgical vessel is a casting ladle.

3. A carrying tower as set forth in claim 1, wherein said metallurgical vessel is a tundish.

4. A carrying tower as set forth in claim 1, wherein said force measuring means are load cells.

5. A carrying tower as set forth in claim 1, further comprising a pressure medium cylinder inserted between said supporting faces of said carrying arm parts.

6. A carrying tower as set forth in claim 1, wherein said at least one carrying arm is designed to be divided transversely to its longitudinal direction.

7. A carrying tower as set forth in claim 1 wherein said force measuring means are attached to one of said supporting faces and loosely contact the opposite supporting face, and further including pressure medium cylinders articulately connecting said supporting faces.

8. A carrying tower as set forth in claim 1 wherein said force measuring means are attached to one of said supporting faces and loosely contact the opposite supporting face, and further including lugs articulately connecting said supporting faces.

9. A carrying tower as set forth in claim 1, wherein said at least one carrying arm, at its projecting end, comprises two arms laterally supporting said metallurgical vessel and having end parts on which said metallurgical vessel rests, and further comprising a bolt arranged on the upper side of each of said arms and lying horizontally in the vertical division plane, said bolts articulately connecting the end part of each of said two arms with its pertaining arm.

10. A carrying tower as set forth in claim 6, wherein each arm has two end parts of different longitudinal extent, the two end parts of each arm being articulately connected with their pertaining arm by a common bolt, said metallurgical vessel being supported at said two end parts of each of said two arms, and wherein each of said two end parts is provided with a supporting face contacting a force measuring means of its own.

* * * * *

UNITED STATES PATENT AND TRADEMARK OFFICE
CERTIFICATE OF CORRECTION

PATENT NO. : 4,286,678

DATED : September 1, 1981

INVENTOR(S) : Scheurecker et al.

It is certified that error appears in the above—identified patent and that said Letters Patent is hereby corrected as shown below:

Col. 3, line 17, after "Using" delete "to".

Col. 4, line 56, "claim 6" should read --claim 9--.

Signed and Sealed this

Twenty-second Day of December 1981

[SEAL]

Attest:

GERALD J. MOSSINGHOFF

Attesting Officer

Commissioner of Patents and Trademarks